United States Patent
Fan et al.

(10) Patent No.: US 9,810,954 B2
(45) Date of Patent: Nov. 7, 2017

(54) DISPLAY PANEL WITH PRIMARY SPACER AND SECONDARY SPACER AND METHOD FOR MANUFACTURING THE SAME AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yuguang Fan, Beijing (CN); Wei Wang, Beijing (CN); Wukun Dai, Beijing (CN); Dengguo Xia, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 302 days.

(21) Appl. No.: 14/427,452

(22) PCT Filed: Jul. 3, 2014

(86) PCT No.: PCT/CN2014/081574
§ 371 (c)(1),
(2) Date: Mar. 11, 2015

(87) PCT Pub. No.: WO2015/109770
PCT Pub. Date: Jul. 30, 2015

(65) Prior Publication Data
US 2015/0378204 A1    Dec. 31, 2015

(30) Foreign Application Priority Data

Jan. 21, 2014  (CN) .......................... 2014 1 0026845

(51) Int. Cl.
*G02F 1/1339* (2006.01)
*G02F 1/1333* (2006.01)

(52) U.S. Cl.
CPC .................... *G02F 1/13394* (2013.01); *G02F 2001/13396* (2013.01); *G02F 2001/133388* (2013.01)

(58) Field of Classification Search
CPC ....... G02F 1/13394; G02F 2001/13396; G02F 2001/133388; G02F 1/133371; G02F 1/13392; G02F 2201/50
(Continued)

(56) References Cited

U.S. PATENT DOCUMENTS

| 7,738,068 B2 | 6/2010 | Lee |
| 7,932,985 B2 | 4/2011 | Oh |
| 2010/0033669 A1 | 2/2010 | Iizawa et al. |

FOREIGN PATENT DOCUMENTS

| CN | 1696776 A | 11/2005 |
| CN | 1991488 A | 7/2007 |

(Continued)

OTHER PUBLICATIONS

Second Chinese Office Action of Chinese Application No. 201410026845.8, dated May 4, 2016 with English translation.
(Continued)

*Primary Examiner* — Huyen Ngo
(74) *Attorney, Agent, or Firm* — Collard & Roe, P.C.

(57) ABSTRACT

A display panel and a method for manufacturing the same and a display device are disclosed, the display panel comprises an array substrate (10) and a cell-assembled substrate (20) arranged oppositely to the array substrate (10), spacers spaced from each other are arranged between the array substrate (10) and the cell-assembled substrate (20), the spacers comprise a plurality of primary spacers (31); and M,
(Continued)

in number, of the primary spacers (31) are provided per unit area in a peripheral region of the display panel, N, in number, of the primary spacers (31) are provided per unit area in a central region of the display panel, and M is greater than (>) N. The display panel can avoid the breakage of the spacers in the peripheral region of the display panel or the breakage of the orientation layer on the spacers.

12 Claims, 4 Drawing Sheets

(58) Field of Classification Search
USPC .................................................. 349/155–157
See application file for complete search history.

(56) References Cited

FOREIGN PATENT DOCUMENTS

| | | |
|---|---|---|
| CN | 101315496 A | 12/2008 |
| CN | 102645793 A | 8/2012 |
| CN | 103472632 A | 12/2013 |
| CN | 103760720 A | 4/2014 |
| JP | 2009276647 A | 11/2009 |

OTHER PUBLICATIONS

Chinese Office Action of Chinese Application No. 201410026845.8, dated Oct. 26, 2015 with English translation.
International Search Report with Notice of Transmittal of the International Search Report of PCT/CN2014/081574 in Chinese, dated Sep. 29, 2014.
Written Opinion of the International Searching Authority of PCT/CN2014/081574 in Chinese with English translation dated Sep. 29, 2014.

Fig.1

Periphery → Center

DISPLAY PANEL WITH PRIMARY SPACER AND SECONDARY SPACER AND METHOD FOR MANUFACTURING THE SAME AND DISPLAY DEVICE

CROSS REFERENCE TO RELATED APPLICATIONS

This application is the National Stage of PCT/CN2014/081574 filed on Jul. 3, 2014, which claims priority under 35 U.S.C. §119 of Chinese Application No. 201410026845.8 filed on Jan. 21, 2014, the disclosure of which is incorporated by reference.

TECHNICAL FIELD

Embodiments of the present disclosure relate to a display panel and a method for manufacturing the same, and a display device.

BACKGROUND

Generally, a liquid crystal display device comprises an array substrate and a color filter substrate as well as a liquid crystal layer provided therebetween. In order to maintain the steadiness and uniformity of the thickness of the liquid crystal layer, it's necessary to provide spacers between the array substrate and the color filter substrate so as to support the panel structure formed by the array substrate and the color filter substrate.

Currently, the common spacer is the post spacer. In order to provide a sufficient restoring force when the display panel is subjected to external pressure, the post spacers are generally divided into primary post spacers and secondary post spacers, the primary post spacer has a height greater than that of the secondary post spacer. After the cell-assembling of the array substrate with the color filter substrate, the primary post spacers contact with the array substrate (or the color filter substrate) and provide a supporting force so as to maintain the cell gap between the array substrate and the color filter substrate; and when the display panel is subjected to pressure, the secondary post spacers also contact with the array substrate (or the color filter substrate), so as to enhance the compression resistance, and after the pressure is removed, the primary post spacers provide the restoring force.

Figure 1:
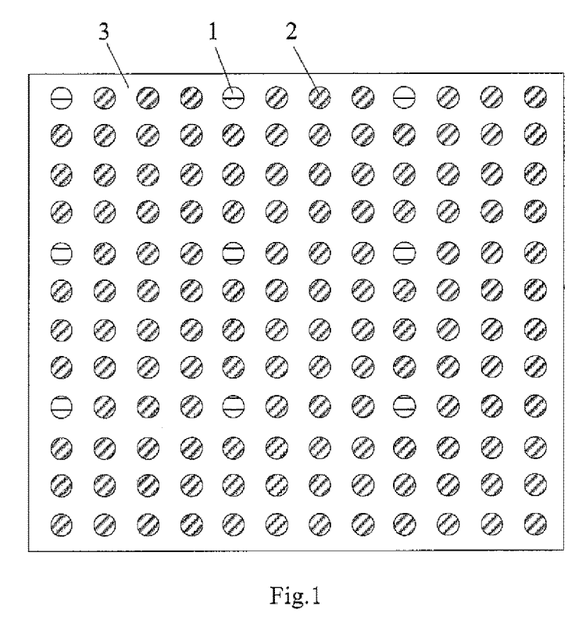
FIG. 1 is a view illustrating a distribution of spacers in a display panel.

As shown in FIG. 1, in a display panel, the primary post spacers 1 and the secondary post spacers 2 are generally provided evenly on the color filter substrate 3 (or can be provided on the array substrate).

SUMMARY

At least one embodiment of the present disclosure provides a display panel and a method for manufacturing the same, and a display device, so that the pressure to which each of the spacers in the peripheral region of the display panel is subjected can be reduced.

At least one embodiment of the present disclosure provides a display panel comprising an array substrate and a cell-assembled substrate arranged oppositely to the array substrate, spacers spaced from each other are provided between the array substrate and the cell-assembled substrate have, the spacers comprise a plurality of primary spacers; M, in number, of the primary spacers are provided per unit area in a peripheral region of the display panel; and N, in number, of the primary spacers are provided per unit area in a central region of the display panel, and M is greater than (>) N.

At least one embodiment of the present disclosure also provides a method for manufacturing a display panel, and the method comprises: providing a cell-assembled substrate and an array substrate which comprise at least one display panel region; and providing spacers on the cell-assembled substrate and/or the array substrate. The spacers comprises primary spacers; M, in number, of the primary spacers are provided per unit area in a peripheral region of the display panel region; and N, in number, of the primary spacers are provided per unit area in a central region of the display panel region, and M is greater than (>) N.

At least one embodiment of the present disclosure also provides a display device comprising the aforesaid display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

1—primary post spacer; 2—secondary post spacer; 31—primary spacer; 32—secondary spacer; 3,10—array substrate; 20—cell-assembled substrate; 11—organic material layer; 12—photoresist layer; 40—mask plate; 41—complete-exposure zone; 42—partial-exposure zone.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

As for the display panel shown in FIG. 1, the inventor of the present application noted that, during the manufacturing process, after the cell-assembling of the array substrate with the color filter substrate to obtain a display panel, and when a thinning process, a second cutting process or the like is performed, the pressure to which the peripheral region of the display panel is subjected is greater than the pressure to which the central region of the display panel is subjected, this can cause the primary post spacers 1 in the peripheral region of the display panel to be damaged, moreover, can also cause the orientation layer contacting with the primary post spacers 1 to be damaged, and thus can influence the structure of the liquid crystal layer. In addition, the impurities, produced due to the breakage of the primary post spacers 1 or the orientation layer on the primary post spacers, can fall into the liquid crystal layer and thus influence the display effect.

Figure 2:
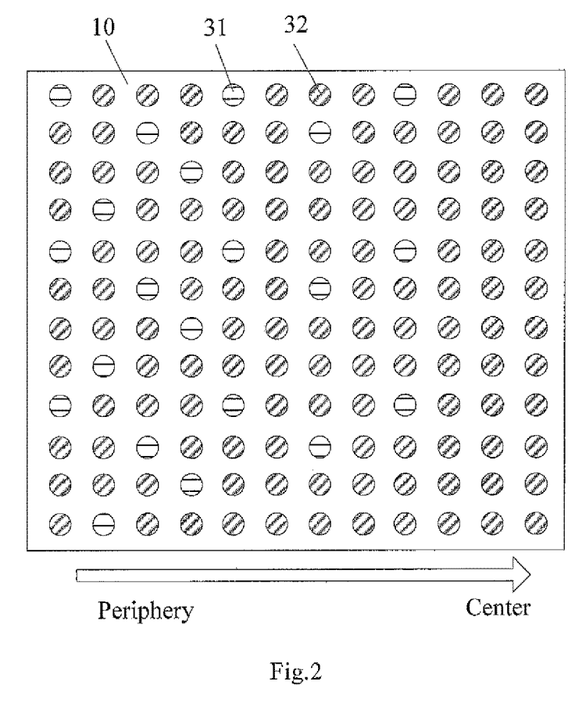
FIG. 2 is a view illustrating a distribution of spacers in a display panel provided by an embodiment of the present disclosure.
Figure 3:
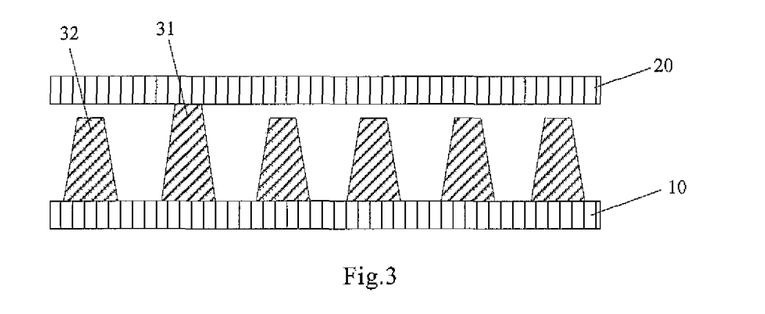
FIG. 3 is a sectional view of a display panel provided by an embodiment of the present disclosure.

At least one embodiment of the present disclosure provides a display panel, as shown in FIGS. 2 and 3, the display panel comprises an array substrate 10 and a cell-assembled substrate 20 arranged oppositely to the array substrate 10. Spacers arranged at intervals are provided between the array substrate 10 and the cell-assembled substrate 20, the spacers comprise a plurality of primary spacers 31, M primary spacers 31 (namely the number of spacers 31 is M) are provided per unit area in a peripheral region of the display panel, N primary spacers 31 (namely the number of primary spacers 31 is N) are provided per unit area in a central region of the display panel, and M is greater than (>) N.

That is to say, the number of the primary spacers 31 provided per unit area in the peripheral region of the display panel can be greater than that of the primary spacers 31 per unit area provided in the central region of the display panel. The peripheral region of the display panel refers to the portion of the display panel adjacent to the edge of each side, and the central region of the display panel refers to the portions at and around the center of the display panel.

The sizes of the peripheral region and the central region of the display panel can be divided according to actual requirements, and embodiments of the present disclosure does not limit in this respect. For example, the portion of the display panel, extending inward from the edge of each side by 1 mm, can be divided into the peripheral region of the display panel, and the portion of the display panel, around and at a distance of no more than 3 mm from the center, is divided into the central region of the display panel.

It's to be understood that the peripheral region and the central region of the above-mentioned display panel means the peripheral region and the central region of each individual display panel obtained after the liquid crystal cell formed by the cell-assembling of the array substrate and the cell-assembled substrate is cut, rather than the peripheral region or the central region of the liquid crystal cell of the mother board.

During the process of thinning and cutting the liquid crystal cell formed by the cell-assembling of the array substrate and the cell-assembled substrate so as to obtain individual display panels, the spacers in the peripheral region of the display panel is subjected to a pressure greater than the pressure to which the spacers in the central region of the display panel is subjected. Accordingly, in the above-mentioned structure, the number of the primary spacers 31 provided per unit area in the peripheral region of the display panel is greater than that of the primary spacers 31 provided per unit area in the central region of the display panel, so that more spacers can be arranged in the peripheral region of the display panel to provide the supporting force, and thus the pressure to which each of the spacers in the peripheral region of the display panel is subjected can be reduced.

With the method of adding more supporting points in the peripheral region, it's possible to avoid the breakage of the spacers in the peripheral region of the display panel as well as the breakage of the orienting layer contacting with the spacers in the peripheral region of the display panel, caused during performing the second cutting and similar processes. Moreover, it's possible to depress the influence upon the stresses at the periphery of the display panel during the process of manufacturing the display panel and during the subsequent working process, and thereby to eliminate the defect caused by the scratching of the spacers and orientation layer, which scratching is produced during cutting the panels.

For example, M can be 2 to 10 times as large as N. That is to say, in order to provide a sufficient supporting force in the peripheral region of the display panel, the number of the primary spacers 31 provided per unit area in the peripheral area of the display panel can be 2 to 10 times as large as that of the primary spacers 31 per unit area provided in the central region of the display panel.

Figure 6A:
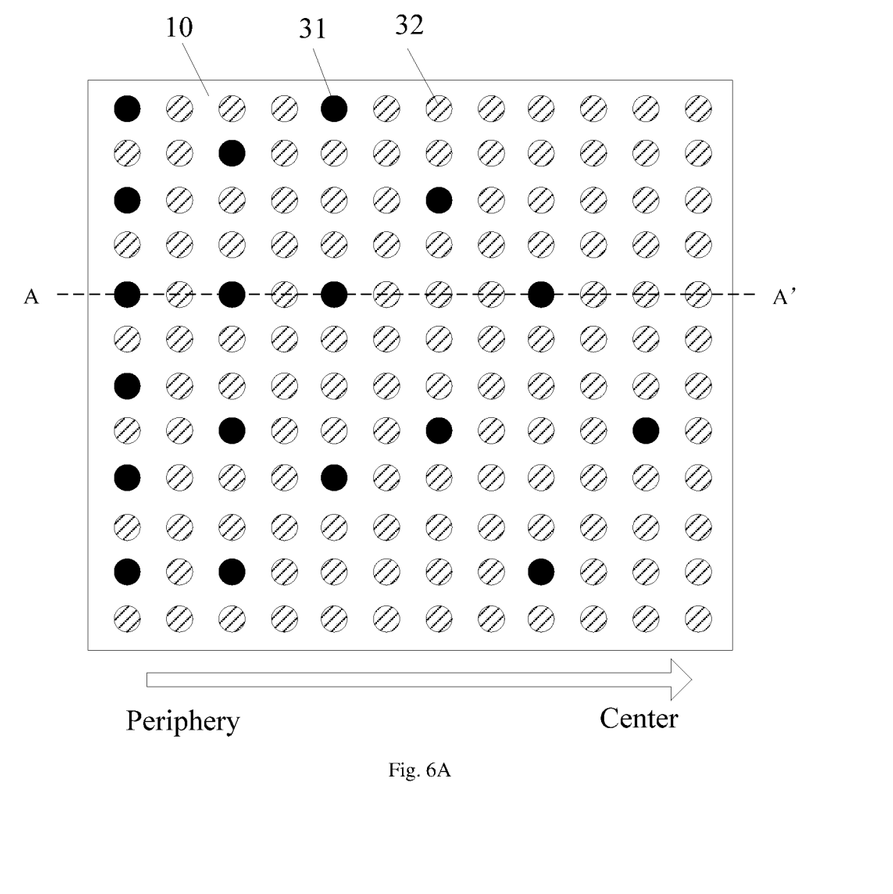
FIG. 6A is a view illustrating a distribution of spacers in a display panel provided by an embodiment of the present disclosure.

For example, as shown in FIG. 6A, the number of the primary spacers 31 per unit area can gradually decrease from the peripheral region to the central region of the display panel. That is to say, the number of the primary spacers 31 can decrease evenly from the peripheral region to the central region of the display panel, so that the primary spacers 31 can provide a more smooth supporting force in the display panel.

Figure 6B:
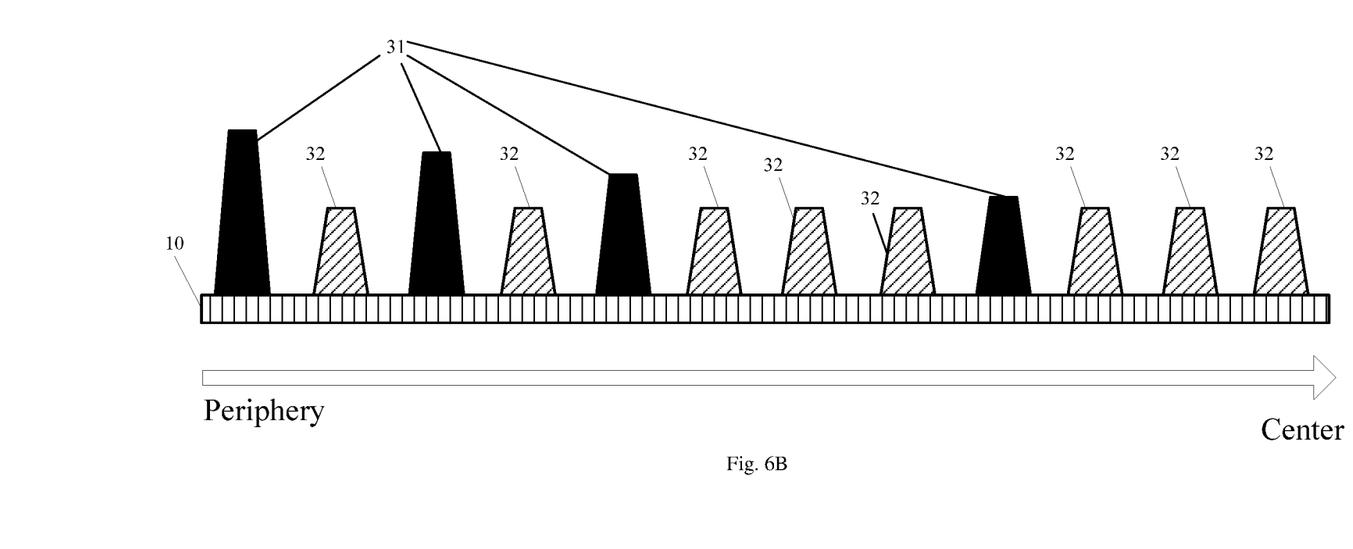
FIG. 6B is a sectional view of the display panel illustrated in FIG. 6A taken along a line A-A'.

For example, the height of the primary spacers 31 in the peripheral region can be greater than that of the primary spacers 31 in the central region. During the processes of thinning and cutting the liquid crystal cell and the like, the pressure to which the peripheral region of the display panel is subjected is greater than the pressure to which the central region is subjected, therefore, besides providing more primary spacers 31 in the peripheral region, the height of the primary spacers 31 in the peripheral region can be greater than that of the primary spacers 31 in the central region as well, and thus the entire display panel can be subjected to a more even force.

For example, as shown in FIG. 6B, the heights of the primary spacers 31 can gradually decrease from the peripheral region to the central region of the display panel. That is to say, the heights of the primary spacers 31 can decrease evenly from the peripheral region to the central region of the display panel, so that the primary spacers 31 can provide a more smooth supporting force in the display panel.

For example, the spacers can further comprise secondary spacers 32, and the height of the primary spacer 31 is greater than that of the secondary spacer 32. The secondary spacers 32 and the primary spacers 31 can be spaced from each other and arranged between the array substrate 10 and the cell-assembled substrate 20, and the height of the secondary spacer 32 can be smaller than that of the primary spacer 31, so that its possible to provide a supporting force when the display panel is pressed. For example, the height of the secondary spacer 32 can be 92%~98% of the height of the primary spacer 31.

The heights of the aforesaid primary spacer and secondary spacer each refer to the heights before the array substrate and the cell-assembled substrate are arranged to be opposite to each other so as to form the liquid crystal cell, that is, the heights before these spacers are compressed. After the cell-assembling, for example, the primary spacers provided on the array substrate contact with the cell-assembled substrate, and the secondary spacers provided on the array substrate may or may not contact with the cell-assembled substrate.

Generally, the spacers between the array substrate 10 and the cell-assembled substrate 20 are evenly distributed, one primary spacer can be provided among a plurality of spacers, and the rest are secondary spacers 32. For example, the number of the primary spacers 31 per unit amount of spacers in the peripheral region of the display panel can be greater than that of the primary spacers 31 in unit amount of spacers in the central region of the display panel. In order to provide the supporting force even more smoothly, the aforesaid primary spacers 31 and secondary spacers 32 can be formed as post spacers.

For example, the spacers can be provided on the array substrate 10 and/or the cell-assembled substrate 20. That is to say, the spacers can be provided on the array substrate 10, or can also be provided on the cell-assembled substrate 20, or alternatively, can be simultaneously provided on the array substrate 10 and the cell-assembled substrate 20. Its to be understood that the aforesaid cell-assembled substrate 20 can be a color filter substrate arranged opposite to the array substrate 10 in a cell-assembled manner.

At least one embodiment of the present disclosure provides a method for manufacturing a display panel, the method comprises: providing a cell-assembled substrate and an array substrate, the array substrate and the cell-assembled substrate comprising at least one display panel region; and providing spacers comprising primary spacers, on the cell-assembled substrate and/or the array substrate. M primary spacers are provided per unit area in a peripheral region of the display panel, N primary spacers are provided per unit area in a central region of the display panel, and M is greater than (>) N.

For example, in the above method, after providing spacers on the cell-assembled substrate and/or the array substrate, the method can further comprise: providing a liquid crystal layer on the array substrate; opposing the cell-assembled substrate to the array substrate to form a liquid crystal cell; and cutting the liquid crystal cell according to the display panel region to obtain at least one display panel.

The display panel region included by the aforesaid array substrate and cell-assembled substrate corresponds to the display panel obtain after cutting the liquid crystal cell. Generally, the liquid crystal cell formed after the cell-assembling of the array substrate with the cell-assembled substrate can be cut into a plurality of display panels. Therefore, corresponding display panel regions can be provided on the array substrate and the cell-assembled substrate, so that corresponding display panels can be obtained when the liquid crystal cell is cut according to the display panel region. The spacers can be manufactured on the cell-assembled substrate and/or the array substrate, so that after the cell-assembling of the cell-assembled substrate and the array substrate, a supporting force can be supplied by the spacers between the cell-assembled substrate and the array substrate. Moreover, the number of the primary spacers provided per unit area in the peripheral region of each display panel can be greater than that of the primary spacers provided per unit area in the central region of the display panel, so as to provide a sufficient supporting force in the peripheral region of each of the display panels.

For example, the spacers made on the cell-assembled substrate and/or the array substrate can further comprise secondary spacers, and the height of the primary spacer is greater than that of the secondary spacer.

For example, the photolithographic method can be employed to prepare the post spacers. For example, the step of providing the spacers on the cell-assembled substrate and/or the array substrate can comprise: depositing an organic material layer used for manufacturing the spacers, on the cell-assembled substrate and/or the array substrate; coating a photoresist layer on the organic material layer; and performing exposure and development upon the organic material layer and the photoresist layer by utilizing a mask plate comprising complete-exposure zones and partial-exposure zones, forming the primary spacers in regions on the cell-assembled substrate and/or the array substrate corresponding to the complete-exposure zones of the mask plate, and forming the secondary spacers in regions on the cell-assembled substrate and/or the array substrate corresponding to the partial-exposure zones of the mask plate.

Figure 4:
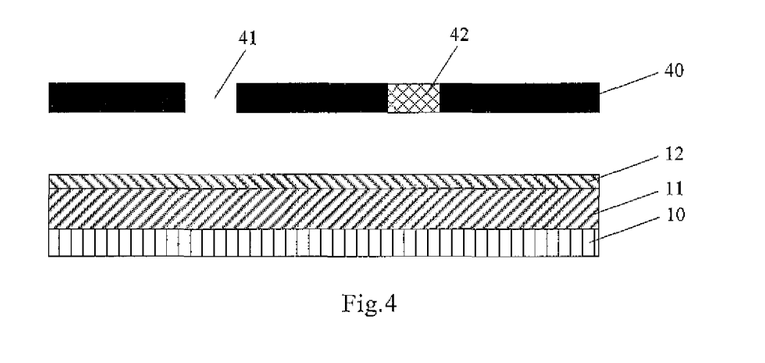
FIG. 4 is a view of using a mask plate to perform exposure upon an organic material layer and a photoresist layer, provided by an embodiment of the present disclosure.
Figure 5:
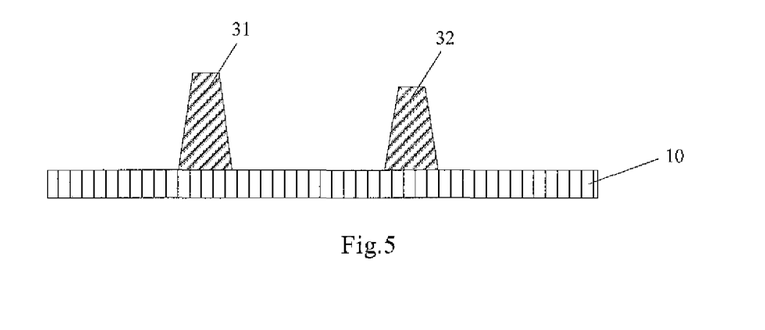
FIG. 5 is a view illustrating formation of a primary spacer and a secondary spacer, provided by an embodiment of the present disclosure.

For example, as shown in FIGS. 4 and 5, the organic material layer 11 and the photoresist layer 12 used for forming the spacers can be deposited on the array substrate 10, afterwards, exposure and development can be performed upon the organic material layer 11 and the photoresist layer 12 through a mask plate 40 comprising a complete-exposure zone 41 and a partial-exposure zone 42, then, a primary spacer 31 can be formed at the region of the array substrate 10 corresponding to the complete-exposure zone 41 of the mask plate 40 through an etching process and so on, and a secondary spacer 32 can be formed at the region of the array substrate 10 corresponding to the partial-exposure zone 42 of the mask plate 40. That is to say, on the array substrate 10, the region corresponding to each complete-exposure zone 41 of the mask plate 40 can be provided with one primary spacer 31 formed therein, and the region corresponding to each partial-exposure zone 42 of the mask plate 40 can be provided with one secondary spacer 32 formed therein. The aforesaid organic material can be polyacrylic resin or polyester resin etc., and embodiments of the present disclosure are not limited thereto.

Furthermore, it's to be understood that what is described above is only examples of the present disclosure, and besides the above manners, other patterning processes can also be used to form the primary spacers and secondary spacers on the array substrate or the cell-assembled substrate. For example, the organic material for forming the respective spacers possesses photosensitivity, so additional photoresist is not required during the photolithography process, and the organic material having photosensitivity is directly performed exposure, and then is performed development to obtain spacers.

For example, the number of the complete-exposure zones per unit area on the mask plate corresponding to the peripheral region of the display panel region is greater than that of the complete-exposure zones per unit area on the mask plate corresponding to the central region of the display panel region. Because the complete-exposure zones on the mask plate corresponds to the primary spacers on the array substrate or the cell-assembled substrate, the number of the complete-exposure zones per unit area on the mask plate, corresponding to the peripheral region of the display panel region, can be greater than the number of the complete-exposure zones per unit area on the mask plate, corresponding to the central region of the display panel region, and thus the quantity of the primary spacers formed per unit area in the peripheral region of the display panel is greater than the quantity of the primary spacers formed in the central region of the display panel.

Furthermore, when the mask plate is used to perform exposure upon the photoresist layer, the exposure time of the complete-exposure zone corresponding to the peripheral region of the display panel region can be longer than the exposure time of the complete-exposure zone corresponding to the central region of the display panel region, so that the height of the primary spacer formed in the peripheral region of the display panel is greater than that of the primary spacer formed in the central region, and thus the display panel is subjected to a more even force.

The display panel and a method for manufacturing the same provided by embodiments of the present disclosure are described above. It can be seen that, by increasing the number of the primary spacers in the peripheral region of the display panel, embodiments of the present disclosure can increase the supporting force provided by more primary spacers in the peripheral region of the display panel, and can reduce the pressure to which each spacer in the peripheral region of the display panel is subjected, and thus its possible to avoid the breakage of spacers in the peripheral region of the display panel and the breakage of the orientation layer contacting with the spacers in the peripheral region of the display panel, which can occur during performing the thinning, cutting and similar processes.

In the embodiment of present disclosure, the array substrate comprises an array structure formed with gate lines, data lines, thin film transistors and pixel electrodes, these gate lines and data lines cross each other to define pixel units arranged in a matrix, each of the pixel units comprises a thin film transistor used as a switching element and a pixel electrode used for controlling the arrangement of the liquid crystal. The cell-assembled substrate can be a color filter substrate having color filter units and black matrix formed thereon. The array substrate can also comprise color filter units, and in such a case, it's not necessary for the cell-assembled substrate to have color filter units formed thereon.

At least one embodiment of the present disclosure also provides a display device which can comprise the aforesaid display panel.

What are described above is related to the illustrative embodiments of the disclosure only and not limitative to the scope of the disclosure; the scopes of the disclosure are defined by the accompanying claims.

The present application claims the benefit of Chinese Patent Application No. 201410026845.8, filed on Jan. 21, 2014, which is hereby entirely incorporated by reference.

What is claimed is:

1. A display panel, comprising an array substrate and a cell-assembled substrate arranged oppositely to the array substrate, wherein spacers spaced from each other are arranged between the array substrate and the cell-assembled substrate, and the spacers comprise a plurality of primary spacers and a plurality of secondary spacers,
wherein M, in number, of the primary spacers are provided per unit area in a peripheral region of the display panel; and N, in number, of the primary spacers are provided per unit area in a central region of the display panel, and M is greater than (>) N;
wherein the peripheral region and the central region of the display panel are also provided with corresponding secondary spacers, a height of each of the primary spacers is greater than that of each of the secondary spacers, and a height of each corresponding primary spacer in the peripheral region is greater than that of each corresponding primary spacer in the central region.

2. The display panel according to claim 1, wherein M is 2 to 10 times of N.

3. The display panel according to claim 2, wherein the number of the primary spacers per unit area gradually decreases from the peripheral region to the central region of the display panel.

4. The display panel according to claim 1, wherein heights of the primary spacers gradually decrease from the peripheral region to the central region of the display panel.

5. The display panel according to claim 1, wherein the spacers are provided on the cell-assembled substrate and/or the array substrate.

6. A display device, comprising a display panel according to claim 1.

7. The display panel according to claim 1, wherein a height of each corresponding secondary spacer in the peripheral region is equal to that of each corresponding second spacer in the central region.

8. A method for manufacturing a display panel, comprising:
providing a cell-assembled substrate and an array substrate, which comprise at least one display panel region; and
providing spacers on the cell-assembled substrate and/or the array substrate, wherein the spacers comprise primary spacers and secondary spacers; M, in number, of the primary spacers are provided per unit area in a peripheral region of the display panel region; and N, in number, of the primary spacers are provided per unit area in a central region of the display panel region, and M is greater than (>) N;
wherein the peripheral region and the central region of the display panel are also provided with corresponding secondary spacers, a height of each of the primary spacers is greater than that of each of the secondary spacers, and a height of each corresponding primary spacer in the peripheral region is greater than that of each corresponding primary spacer in the central region.

9. The method for manufacturing the display panel according to claim 8, after providing the spacers on the cell-assembled substrate and/or the array substrate, further comprising:
providing a liquid crystal layer on the array substrate;
opposing the cell-assembled substrate to the array substrate to form a liquid crystal cell; and
cutting according to the display panel region to obtain at least one display panel.

10. The method for manufacturing the display panel according to claim 8, comprising:
preparing the spacers by using a photolithography process.

11. The method for manufacturing the display panel according to claim 10, wherein preparing the spacers by using the photolithography process comprises:
depositing an organic material layer configured for manufacturing the spacers, on the cell-assembled substrate and/or the array substrate;
coating a photoresist layer on the organic material layer; and
using a mask plate comprising complete-exposure zones and partial-exposure zones to perform exposure and development upon the organic material layer and the photoresist layer, forming the primary spacers in regions on the cell-assembled substrate and/or the array substrate, which regions are corresponding to the complete-exposure zones of the mask plate, and forming the secondary spacers in regions on the cell-assembled substrate and/or the array substrate, which regions are corresponding to the partial-exposure zones of the mask plate.

12. The method for manufacturing the display panel according to claim 11, wherein the number of the complete-exposure zones per unit area on the mask plate, corresponding to the peripheral region of the display panel region, is greater than that of the complete-exposure zones per unit area on the mask plate, corresponding to the central region of the display panel region.

* * * * *